US007542576B2

(12) United States Patent
Tashiro

(10) Patent No.: US 7,542,576 B2
(45) Date of Patent: Jun. 2, 2009

(54) HOWLING DETECTION CIRCUIT

(75) Inventor: Takahiro Tashiro, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 254 days.

(21) Appl. No.: 11/361,182

(22) Filed: Feb. 24, 2006

(65) Prior Publication Data

US 2006/0198532 A1 Sep. 7, 2006

(30) Foreign Application Priority Data

Mar. 1, 2005 (JP) ............................ 2005-055342

(51) Int. Cl.
*H04B 15/00* (2006.01)

(52) U.S. Cl. ........................................................ 381/93

(58) Field of Classification Search ................. 381/318, 381/93

See application file for complete search history.

(56) References Cited

U.S. PATENT DOCUMENTS 4,250,463 A * 2/1981 Foster ........................ 330/298
5,818,926 A * 10/1998 Challis .................. 379/399.01
2003/0184391 A1* 10/2003 Sekimoto ..................... 331/74

FOREIGN PATENT DOCUMENTS

JP 04-277977 10/1992

* cited by examiner

*Primary Examiner*—Alexander Jamal
(74) *Attorney, Agent, or Firm*—Morrison & Foerster LLP

(57) ABSTRACT

In a howling detection circuit, an audio signal voltage generator generates an audio signal voltage based on a level of an input audio signal. A capacitor is chargeable and dischargeable by the audio signal voltage and develops a monitor voltage. An indication circuit is activated depending on the monitor voltage to provide an alert indicating that a howling noise is contained in the input audio signal. A discharging element discharges the capacitor according to a first time constant when the audio signal voltage is lower the monitor voltage, thereby lowering the monitor voltage. A charging element charges the capacitor according to a second time constant being set greater than the first time constant when the audio signal voltage is higher than the monitor voltage, thereby raising the monitor voltage so as to activate the indication circuit.

4 Claims, 1 Drawing Sheet

HOWLING DETECTION CIRCUIT

BACKGROUND OF THE INVENTION

1. Technical Field of the Invention

Figure 1:
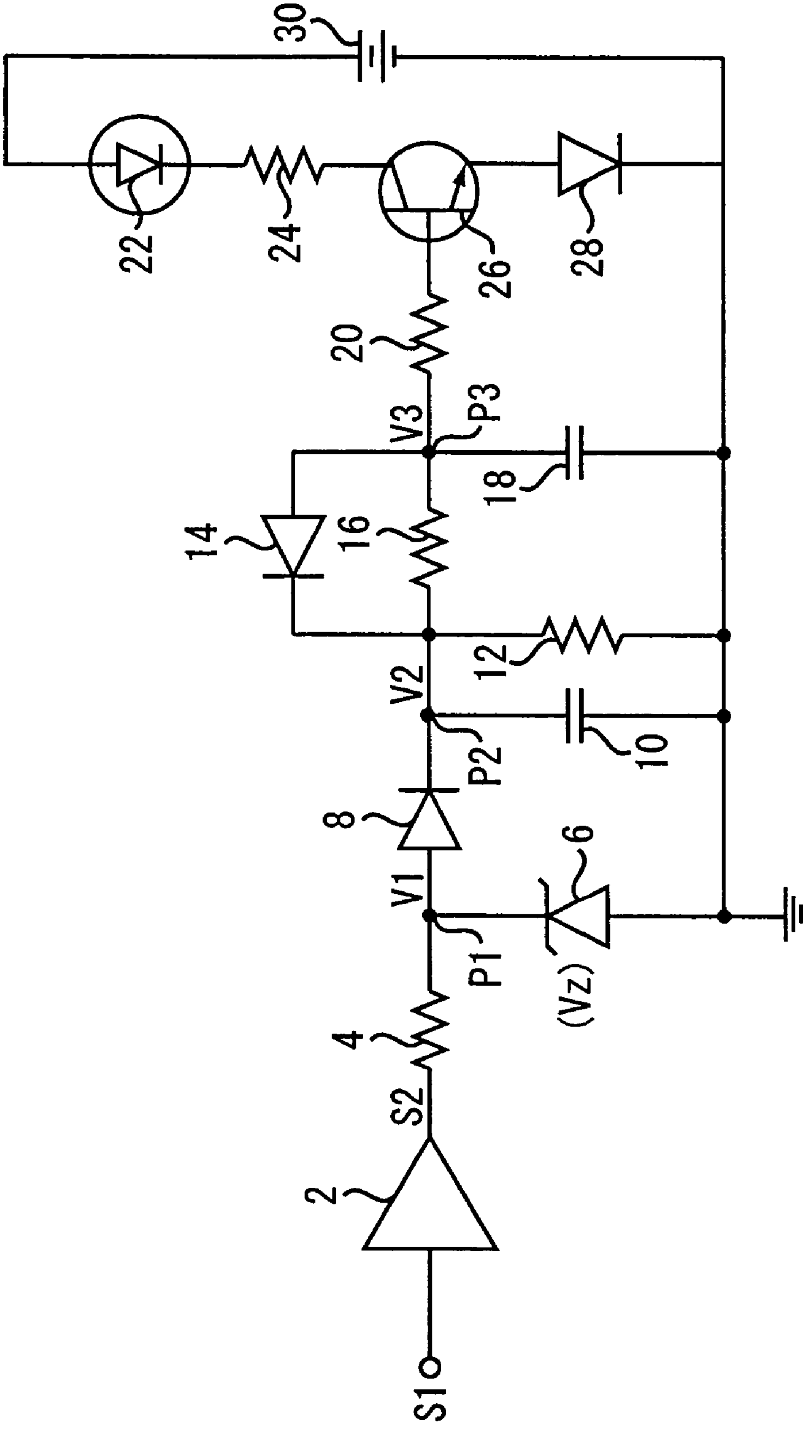

The present invention relates to a howling detection circuit which is suitable for use in an audio mixer or the like.

2. Description of the Related Art

When howling occurs, a mixer or the like has to specify the source of the howling promptly and perform a level control, frequency characteristic control or the like in association with the specified source. Various techniques have been proposed with respect to a howling detection method. For example, disclosed in Japanese Patent Laid-open Publication No. Heisei 4-277977 is a technique that detects howling by measuring the levels of respective frequency components of an audio signal, comparing the measured level of each of the frequency components with those of the other frequency components and determining from the comparison whether a frequency component of an unnaturally high level is present in the frequency components of the audio signal.

However, the above-mentioned technique is disadvantageous in that complex processes, such as frequency component detection, etc., are required, resulting in complexity in configuration of a howling detection circuit and increase in cost when the howling detection circuit is installed in a mixer or the like. Particularly, because the mixer mixes audio signals of a plurality of input channels to generate an output signal, it must have the howling detection circuit for each of the input channels and, when howling occurs, promptly specify one of the input channels as the source of the howling. In this configuration, howling detection circuits of a number corresponding to that of the input channels are required, causing increase in cost.

Assume that an audio signal inputted from a microphone is amplified by an amplifier, outputted through a speaker and then fed back to the microphone. In this case, if a frequency component whose gain in one circulation of the input audio signal to the microphone exceeds “1” is present, howling occurs in that frequency component. Once the howling occurs, it continues ceaselessly as long as there is no change in the position relationship between the microphone and the speaker or the gain of the amplifier. Meanwhile, assume that a human voice or natural musical instrument’s sound is inputted through the microphone. In this case, a “node” may be present in the voice or sound. This node may be regarded as a timing at which the variable level of the input audio signal falls during the utterance of the voice or sound. In this regard, whether or not the howling has occurred can be easily determined on the basis of the presence or not of the “node” in the microphone input.

SUMMARY OF THE INVENTION

The present invention has been made in view of the above problems, and it is an object of the present invention to provide a howling detection circuit which is capable of detecting a howling with a simple configuration.

In order to achieve the above object, the present invention is characterized by a configuration described below. Here, elements in parentheses are references for illustrative purposes.

In accordance with the present invention, the above and other objects can be accomplished by the provision of a howling detection circuit comprising: an audio signal voltage generator (2, 4, 6 and 8) for generating an audio signal voltage (V2) based on a level of an input audio signal; a capacitor (18); an indication circuit (22, 24, 26, 28 and 30) for providing an alert depending on a monitor voltage (V3), the monitor voltage (V3) being a voltage across the capacitor (18); a discharging element (12) for discharging the capacitor (18) according to a first time constant ((C10+C18)R12) when the monitor voltage (V3) is higher than or equal to the audio signal voltage (V2), namely when the audio signal voltage (V2) is lower than or equal to the monitor voltage (V3); and a charging element (16) for charging the capacitor (18) according to a second time constant (R16·C18) when the monitor voltage (V3) is lower than the audio signal voltage (V2), namely when the audio signal voltage (V2) is higher than the monitor voltage (V3), the second time constant (R16·C18) being larger than the first time constant ((C10+C18)R12).

Preferably the audio signal voltage generator (2, 4, 6 and 8) of the inventive howling detection circuit includes a limiter (6) for setting the audio signal voltage (V2) substantially in proportion to the level of the input audio signal when the level of the input audio signal is lower than or equal to a predetermined value (Zener voltage Vz), and limiting increase in the audio signal voltage (V2) against increase in the level of the input audio signal when the level of the input audio signal exceeds the predetermined value (Zener voltage Vz).

In this manner, in accordance with the present invention, the capacitor is rapidly discharged according to the first time constant when the monitor voltage is higher than or equal to the audio signal voltage, and it is slowly charged according to the second time constant when the monitor voltage is lower than the audio signal voltage. Therefore, if a “node” of voice or sound where the level of the input audio signal is lowered takes place during the utterance, the monitor voltage can be immediately reduced, thereby making it possible to detect a howling with a simple configuration.

DETAILED DESCRIPTION OF THE DRAWINGS

FIG. 1 is a circuit diagram of a howling detection circuit according to an exemplary embodiment of the present invention.

DETAILED DESCRIPTION OF THE INVENTION

1. Configuration of Embodiment

The configuration of a howling detection circuit according to an exemplary embodiment of the present invention will hereinafter be described with reference to FIG. 1.

The present howling detection circuit is provided for every input channel of a mixer to detect and indicate occurrence of howling in a corresponding input channel. In FIG. 1, the reference numeral 2 denotes an amplifier that amplifies an input audio signal S1 of the corresponding input channel and outputs the amplified audio signal as an audio signal S2. The audio signal S2 is applied across a Zener diode 6 through a resistor 4. Here, a voltage V1 appearing at a point P1, which is the cathode of the Zener diode 6, is close to “0V” when the input audio signal S1 has a negative polarity, and is in proportion to an instantaneous value of the input audio signal S1 when the input audio signal S1 has a positive polarity and the output level of the amplifier 2 is lower than or equal to a Zener voltage Vz of the Zener diode 6. When the output level of the amplifier 2 exceeds the Zener voltage Vz, the voltage V1 is close to the Zener voltage Vz.

Here, the Zener voltage Vz is set to a level that the amplitude of the audio signal S2 is expected to reach when a howling occurs in the input audio signal S1. If the amplitude of the audio signal S2 exceeds the Zener voltage Vz, the voltage V1 has a substantially square waveform with an amplitude of the Zener voltage Vz. In this case, the waveform of the voltage V1 is little influenced by variations in level of the input audio signal S1. The voltage V1 is applied through a diode 8 to a capacitor 10 and resistor 12 connected in parallel. As a result, a voltage V2 appearing at a point P2, which is a connection point of the diode 8 and resistor 12, has a smoothed waveform of the voltage V1. In other words, in the case where a howling occurs in the input audio signal S1 and the amplitude of the audio signal S2 exceeds the Zener voltage Vz, the voltage V2 is almost constant irrespective of the magnitude of the howling. Here, the capacitor 10 has a capacitance C10 of "2.2 μF" and the resistor 12 has a resistance R12 of "1 kΩ". Therefore, if the level of the audio signal S1 is lowered and the voltage V1 is thus reduced, charge in the capacitor 10 is rapidly discharged through the resistor 12, thereby causing the voltage V2 to be rapidly reduced.

The signal voltage V2 is then applied to a capacitor 18 through a parallel circuit of a diode 14 and resistor 16. Here, a voltage appearing at a point P3, which is one end of the capacitor 18, is monitor voltage V3. The diode 14 has an anode connected to the point P3 and a cathode connected to the point P2. The resistor 16 has a relatively large resistance R16 of "68 kΩ", and the capacitor 18 has a relatively large capacitance C18 of "22 μF". As a result, in the case where the relationship of "V2>V3" is established with respect to the voltages V2 and V3, the relatively large time constant of the resistor 16 and capacitor 18 is "R16·C18=1.496", so the capacitor 18 is slowly charged, thereby causing the voltage V3 to slowly approach the voltage V2. On the other hand, in the case where the relationship of "V2<V3" is established with respect to the voltages V2 and V3, current flows from the capacitor 18 to the capacitor 10 through the diode 14, thus maintaining a state of "V2≈V3". That is, the value of "V3−V2" is a forward voltage drop (about 0.6V) of the diode 14 at maximum. In this state, because charges in the capacitor 10 and capacitor 18 are discharged through the resistor 12, the time constant for the discharging is "(C10+C18) R12=0.0242", which is about "1/60" of that for the charging.

The monitor voltage V3 is then applied to the base terminal of a transistor 26 through a current limiting resistor 20. The emitter terminal of the transistor 26 is grounded through a diode 28 and the collector terminal thereof is applied with a predetermined direct current (DC) voltage from a power source 30 through a resistor 24 and a light emitting diode (LED) 22 for howling alert. Assume that the DC base voltage of the transistor 26 in an ON state thereof is VBE and the forward voltage drop of the diode 28 is VD. In this case, when the monitor voltage V3 is higher than or equal to an ON voltage Von (=VBE+VD), the transistor 26 is turned on, thereby causing current to flow through the LED 22, resistor 24, transistor 26 and diode 28 and, thus, the LED 22 to be lit.

2. Operation of Embodiment

In the above configuration, when a howling occurs in the input audio signal S1 and the amplitude of the audio signal S2 exceeds the Zener voltage Vz of the Zener diode 6, the voltage V1 has a substantially square waveform with an amplitude of the Zener voltage Vz and the signal voltage V2 immediately rises to a smoothed level of the voltage V1. At this time, if the relationship of "V2>V3" is established with respect to the voltages V2 and V3, the capacitor 18 is slowly charged through the resistor 16. In the case where the howling occurs, the monitor voltage V3 becomes higher than or equal to the ON voltage Von after this state continues for several seconds. As a result, the transistor 26 is turned on to light the LED 22.

Because the present howling detection circuit is installed for each input channel of the mixer as stated above, the LED 22 for howling alert is also provided for each input channel of the mixer and disposed on an operating panel of the mixer. Accordingly, if the LED 22 is lit, the user can immediately recognize that the possibility of howling generation is high in the associated input channel and thus readily take necessary measures, including reducing a fader of the associated input channel.

On the other hand, the amplitude of the audio signal S2 may incidentally exceed the Zener voltage Vz even in a no howling state. However, in the case where the input audio signal S1 corresponds to, for example, a human voice or general musical instrument's sound inputted through the microphone, a "node" of the voice or sound, namely, a timing at which the level falls, is present in the audio signal S2. At the moment that the level of the audio signal S2 falls, the voltage V2 is immediately reduced so as to become equal to the voltage V3. Then, the charges stored in the capacitor 10 and capacitor 18 are rapidly discharged through the resistor 12, so that the voltages V2 and V3 become adequately low. In this manner, in the case where the input audio signal S1 purely contains a human voice or general musical instrument's sound, the charge stored in the capacitor 18 is discharged before the voltage V3 reaches the ON voltage Von, so the LED 22 is not lit.

As described above, the audio signal voltage generator generates the audio signal voltage V2, which has a variable voltage level when the input audio signal V1 is free of the howling noise, and which has a monotonous voltage level when the input audio signal V1 contains the howling noise, such that the variable voltage level of the audio signal voltage V2 enables the discharging element 12 to avoid raising of the monitor voltage V3, while the monotonous voltage level of the audio signal voltage V2 enables the charging element 16 to enhance raising of the monitor voltage V3.

As described above, according to the present embodiment, it is possible to detect a howling appearing in the input audio signal S1 with a simple circuit. In particular, when the level of the audio signal S1 rises slowly from "0", the voltage V2 increases slowly in proportion to the amplitude of the audio signal S1. However, after the amplitude of the audio signal S2 reaches the Zener voltage Vz of the Zener diode 6, the voltage V2 is limited so as to be almost constant. Therefore, when a howling occurs, it is possible to detect the howling occurrence on the basis of substantially the same reference based on the "duration" of the howling almost irrespective of the "level" of the howling.

3. Modified Embodiments

Although the preferred embodiment of the present invention has been disclosed for illustrative purposes, those skilled in the art will appreciate that various modifications, additions and substitutions are possible, as in the following examples.

(1) Although the charging time constant of the capacitor 18 has been disclosed in the above embodiment to be "about 60 times" as large as the discharging time constant of the capacitor 18, the time constant ratio is not limited thereto. The effect of the invention can be obtained as long as the charging time constant is greater than the discharging time constant. For example, the charging time constant is preferably "10 times" or more as large as the discharging time constant, more preferably "30 times" or more, and most preferably "50 times" or more.

As described above, the charging time constant is set greater than 10 times of the discharging time constant, more preferably "30 times" or more, and most preferably "50 times" or more, so that the discharging element 12 rapidly discharges the capacitor 18 as compared to the charging of the capacitor 18 and the charging element 16 gradually charges the capacitor 18 as compared to the discharging of the capacitor 18. Typically, the discharging time is set less than 0.1 second while the charging time is set more than 1 second.

(2) Although the howling detection circuit disclosed in the above embodiment is applied to the audio mixer, the present invention is not limited thereto, but is applicable to howling detection in various audio devices. For example, the circuit of the above embodiment may be built in an individual microphone. In this case, provided that the LED 22 is lit, the user of the associated microphone will be able to recognize occurrence of a howling in the associated microphone and thus take necessary measures, including changing the direction of the microphone.

The invention claimed is:

1. A howling detection circuit comprising:

an audio signal voltage generator that generates an audio signal voltage based on a level of an input audio signal;

a capacitor that is chargeable and dischargeable by the audio signal voltage and develops a monitor voltage;

an indication circuit that is activated depending on the monitor voltage to provide an alert indicating that a howling noise is contained in the input audio signal;

a discharging element that discharges the capacitor according to a first time constant when the audio signal voltage is lower the monitor voltage, thereby lowering the monitor voltage; and a charging element that charges the capacitor according to a second time constant being set greater than the first time constant when the audio signal voltage is higher than the monitor voltage, thereby raising the monitor voltage so as to activate the indication circuit, wherein the audio signal voltage generator generates the audio signal voltage, which has a variable voltage level when the input audio signal is free of the howling noise, and which has a monotonous voltage level when the input audio signal contains the howling noise, the monotonous voltage level being less variable than the variable voltage level, such that the variable voltage level of the audio signal voltage enables the discharging element to avoid raising of the monitor voltage, while the monotonous voltage level of the audio signal voltage enables the charging element to enhance raising of the monitor voltage.

2. The howling detection circuit as set forth in claim 1, wherein the audio signal voltage generator includes a limiter that sets the audio signal voltage substantially in proportion to the level of the input audio signal when the level of the input audio signal is lower than a predetermined value, and that limits increase in the audio signal voltage against increase in the level of the input audio signal when the level of the input audio signal exceeds the predetermined value.

3. The howling detection circuit as set forth in claim 1, wherein the second time constant is set greater than 10 times of the first time constant, so that the discharging element rapidly discharges the capacitor as compared to the charging of the capacitor and the charging element gradually charges the capacitor as compared to the discharging of the capacitor.

4. The howling detection circuit as set forth in claim 3, wherein the second time constant is set greater than 50 times of the first time constant.

* * * * *